Nov. 23, 1948.  R. N. PALMER  2,454,522

TUBULAR SAW CHUCK

Filed Dec. 26, 1944

INVENTOR.
Rufus N. Palmer
BY Bair & Freeman
Att'ys.

Patented Nov. 23, 1948

2,454,522

UNITED STATES PATENT OFFICE 2,454,522

TUBULAR SAW CHUCK

Rufus N. Palmer, Pittsburgh, Pa., assignor to American Pearl Button Co., Washington, Iowa, a corporation of Iowa Application December 26, 1944, Serial No. 569,750

4 Claims. (Cl. 79—16)

My present invention relates to a chuck particularly adapted for holding a tubular saw for cutting disks such as button blanks from mussel shells and the like, or disks from any material, which chuck may be used in a standard drill press.

One object of the invention is to provide a chuck which accurately centers the saw with respect to the chuck, without the necessity of providing radially movable chuck jaws and a means to synchronize their movement as in an ordinary "Jacobs" drill chuck.

Another object is to provide a chuck wherein a saw sleeve is provided to receive the saw, and the saw sleeve is received in the body of the chuck in such manner as to seat against one-half of the bore therein under the pressure of set screw means opposite the seat, the saw sleeve being relieved around that half of its periphery opposite the seated portion of the saw sleeve.

Still another object is to provide the saw sleeve with a similar seat for a tubular saw and held against said seat by set screw means with the interior bore of the saw sleeve relieved opposite the seated portion of the saw.

Still another object is to provide a tubular saw chuck which permits the use of a button blank or disk expeller of the kind shown in my copending application, Serial No. 542,408, filed June 27, 1944.

A further object is to provide a chuck of this general character which has the parts thereof arranged compactly and which is provided with a shank to fit into the spindle of a standard drill press so that special machinery is not needed for mounting and operating the chuck and so that the chuck may be readily removed and inserted into another drill press as needed.

With these and other objects in view, my invention consists in the construction, arrangement and combination of the various parts of my chuck whereby the objects contemplated are attained, as hereinafter more fully set forth, pointed out in my claims and illustrated in the accompanying drawings, wherein:

Figure 1:
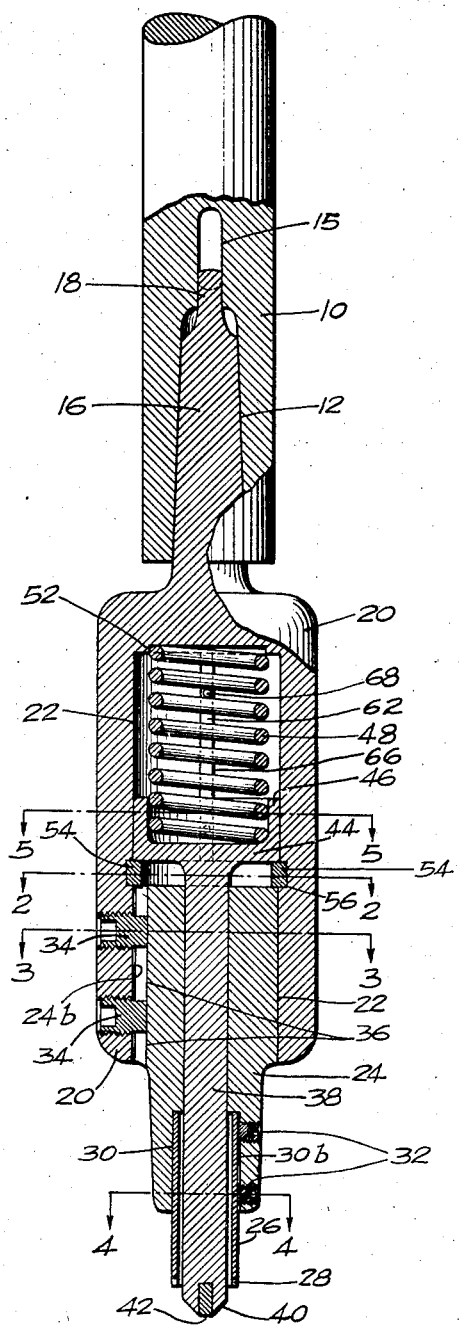
Fig. 1 is a vertical sectional view through a chuck embodying my invention and showing it mounted in the spindle of a drill press.

On the accompanying drawing I have used the reference numeral 10 to indicate the rotating spindle of a drill press. The spindle 10 may have a Morse taper bore 12 and a slot 15 to receive a tapered shank 16 and its flattened upper end 18 of my chuck. Other coacting arrangements may be provided for mounting the chuck on the spindle. The shank 16 is formed on the body of the chuck, which body is indicated at 20.

The body 20 has a bore 22 therein which is formed accurately concentric to the axis of the shank 16. The bore 22 is adapted to receive a saw sleeve 24 which, in turn, is adapted to receive a tubular saw 26 for cutting button blanks and the like, the saw having saw teeth as indicated at 28.

Figure 3:
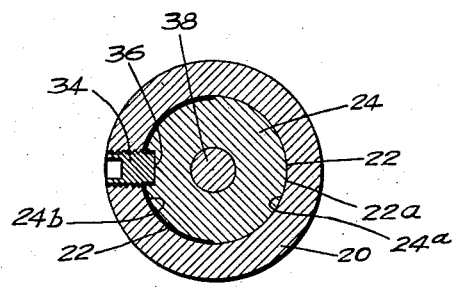
Fig. 3 is a horizontal sectional view on the line 3—3 of Fig. 1, showing the saw sleeve held in position by set screw means.

The saw 26 is received in a bore 30 of the saw sleeve 24. The saw sleeve 24 has its right half indicated at 24a in Fig. 3 accurately seated in the right half of the body 22 which is indicated at 22a. The other half of the sleeve 24 is slightly relieved (about .002 inch) as indicated at 24b.

A pair of set screws 34 are threaded in the chuck body 20, and seat in a groove 36 formed in the saw sleeve 24. The set screws are opposite the seat 22a and firmly seat the saw sleeve therein. At the same time, the saw sleeve is accurately centered in relation to the axis of the chuck 16, so that the saw will run true.

Fitting inside the saw sleeve 24 and loosely inside the saw 26 is an expeller rod 38. The rod 38 has a conical lower end or point 40, slightly flattened at the extreme lower end as indicated at 42, and as fully disclosed in my above-mentioned copending application. The upper end of the expeller rod has a head 44 terminating in an annular flange 46. The expeller rod is constrained to move outwardly by a spring 48 having its one end seated on the head 44 within the flange 46, and its upper end seated in a seat 52 of the chuck body 20.

Figure 2:
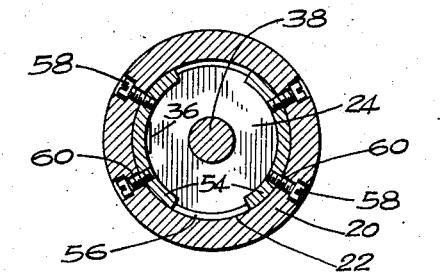
Fig. 2 is a horizontal sectional view on the line 2—2 of Fig. 1 showing an expeller rod of the chuck and a means to limit its outward movement.

A stop is provided for the head 44 consisting of a pair of ring sections 54, seated in an annular groove 56 of the bore 22. The ring sections are held in position by screws 58 threaded thereinto after passing loosely through holes 60 in the chuck body, as shown in Fig. 2. The ring sections 54 operate as limit stops in an inward direction for the saw sleeve 24 and in an outward direction for the expeller rod to prevent it from dropping out of position. They are made in sections to facilitate assembly of the chuck.

Figure 4:
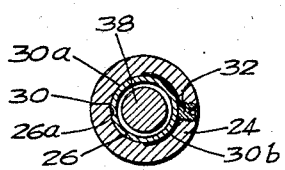
Fig. 4 is a horizontal sectional view on the line 4—4 of Fig. 1 showing the saw itself held in the saw sleeve.
Figure 5:
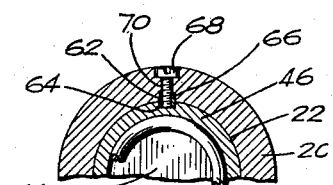
Fig. 5 is a horizontal sectional view on the line 5—5 of Fig. 1 showing a key to prevent the expeller rod from turning relative to the chuck.

The saw 26 is seated in the saw sleeve 24 in a manner similar to that described in connection with the seating of the saw sleeve in the chuck body. Referring to Fig. 4, the left half of the bore 30 constitutes a seat 30a for the left half of the saw which is indicated at 26a. Set screws 32 are provided for rigidly holding the saw in the saw sleeve. The interior of the bore 30 is then relieved, as indicated at 30b, with the relief portion extending equidistant on each side of the set screws 32, whereas the seating portions 26a and 30a are opposite the set screws. The set screws 32 and 34 are preferably on diametrically opposite sides of the saw sleeve 24.

To prevent the expeller rod 38 from rotating relative to the chuck body 20 I provide a vertical keyway 62 in the bore 22 of the chuck and a similar vertical keyway 64 in the flange 46 of the expeller rod head 44. A key 66, which is substantially square in cross-section, is held in the keyway 62 by a pair of screws 68 passing loosely through holes 70 of the chuck body and threaded into the key.

Practical operation

In the operation of my chuck, it may be readily supported in the drill spindle 10 for forcing the shank 16 into the tapered bore 12 thereof in the usual manner. Either the spindle 10 may be lowered toward a mussel shell or the like which is supported on a suitable support, as shown in my copending application, or such support may be raised toward the saw 26. First there will be contact between the end 42 of the rod 38 and the shell. The spring 48 will then be compressed for causing the expeller rod 38 to hold the shell firmly against the support so that the saw 26 can cut a button blank therefrom. The saw and support are then moved relatively away from each other to first remove the saw from the shell and then expel the button blank from the saw, all as fully described in said copending application.

When the saw 26 becomes dulled from use, and it is desirable to replace it with a sharp one, the set screws 32 are slightly loosened so that the saw can drop out of the saw sleeve 24 or be removed therefrom and replaced with another one. If a saw of another size is to be used, then the set screws 34 can be loosened and a saw sleeve of different size substituted. Such sleeve would have a different size bore 30 but its outside surface would be the same so as to fit the body 20.

An arrangement of the type disclosed produces a tubular saw chuck which is very simple in construction and results in a true running saw whenever a saw is mounted in the chuck. The complications of a multiple jaw chuck are eliminated and the relatively broad seating surfaces 22a and 24a minimize wear so that any slight inaccuracy which does develop occurs only after an extremely long period of use.

As to the seating arrangements of the saw sleeve 24 in the chuck body and the saw 26 in the saw sleeve, the relieved portions 24b and 30b are preferably both formed in the saw sleeve itself.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a chuck for tubular saws, a hollow body, a saw sleeve therein, a tubular saw in said sleeve, an annular interior groove in said body, an arcuate stop element therein and having a stop portion projecting sufficiently far into the bore of said body to be engaged by said sleeve, an expeller rod having a head of sufficient size to be engageable with the inner surface of said arcuate stop element, and a spring within said body and biasing said head toward said stop element, said arcuate stop element limiting the inward movement of said sleeve in the bore of said body.

2. In a chuck of the character disclosed, a hollow body, a saw sleeve therein, a tubular saw in said sleeve, an annular interior groove in said body, an arcuate stop element therein and projecting inwardly from said groove whereby it is adapted to be engaged by said sleeve, an expeller rod head engageable with the upper surface of the inwardly projecting portion of said arcuate stop element, an expeller rod depending from said expeller rod head, a spring within said body and biasing said head toward said stop element, and means to prevent rotation of said expeller rod relative to said body.

3. In a tubular saw chuck, a body having a bore, a saw holding sleeve received in said bore, said sleeve snugly fitting substantially an entire one-half of said bore for centering the sleeve relative to the bore, means carried by said body for pressing said sleeve toward said half with substantially equal pressure throughout the length thereof, said sleeve having clearance between the bore and sleeve throughout the extent of the remaining half opposite said first half whereby said sleeve may be readily removed when said means is loosened, a tubular saw received in said sleeve, a second means to hold said saw against substantially an entire one-half of the interior surface of said sleeve for centering the saw relative thereto, said sleeve being throughout the extent of its remaining half opposite the first half of its interior surface, provided with clearance in relation to the surface of the saw whereby said saw may be readily removed when said second means is loosened.

4. In a tubular saw chuck, a body having a bore, a saw holding sleeve received in said bore, said sleeve snugly fitting substantially one-half of said bore for centering the sleeve relative to the bore, a set screw carried by said body for pressing said sleeve toward said half, a tubular saw received in said sleeve, a second set screw to hold said saw against substantially one-half of the interior of the surface of said sleeve for centering the saw relative thereto, the exterior surface of said sleeve being relieved substantially one-half its diameter opposite the seated portion thereof in said body, and the interior surface of said sleeve being relieved for substantially one-half its diameter opposite the seated saw therein.

RUFUS N. PALMER.

REFERENCES CITED

The following references are of record in the file of this patent:

UNITED STATES PATENTS

| Number | Name | Date |
| --- | --- | --- |
| 308,842 | Hunt | Dec. 2, 1884 |
| 473,231 | Leffel | Apr. 19, 1892 |
| 508,795 | Workheiser | Nov. 14, 1893 |
| 831,393 | Watson | Sept. 18, 1906 |
| 832,546 | Glidden | Oct. 2, 1906 |
| 1,129,166 | Chalmers | Feb. 23, 1915 |
| 2,163,338 | Hopkins | June 20, 1939 |
| 2,287,882 | Huff | June 30, 1942 |

FOREIGN PATENTS

| Number | Country | Date |
| --- | --- | --- |
| 14,539 | Germany | Aug. 6, 1881 |
| 417,248 | France | Aug. 25, 1910 |